3,613,418
AUTOMATIC CONTROL SYSTEM FOR HOT STRIP MILL AND THE LIKE
Akinao Nara, Kodaira-shi, and Masahisa Ono, Nishinomiya-shi, Japan, assignors to Sumitomo Metal Industries, Ltd., Osaka, and Hitachi, Ltd., Tokyo, Japan
Filed Jan. 26, 1970, Ser. No. 5,493
Claims priority, application Japan, Feb. 12, 1969, 44/9,717
Int. Cl. B21b 37/10
U.S. Cl. 72—8                                    1 Claim

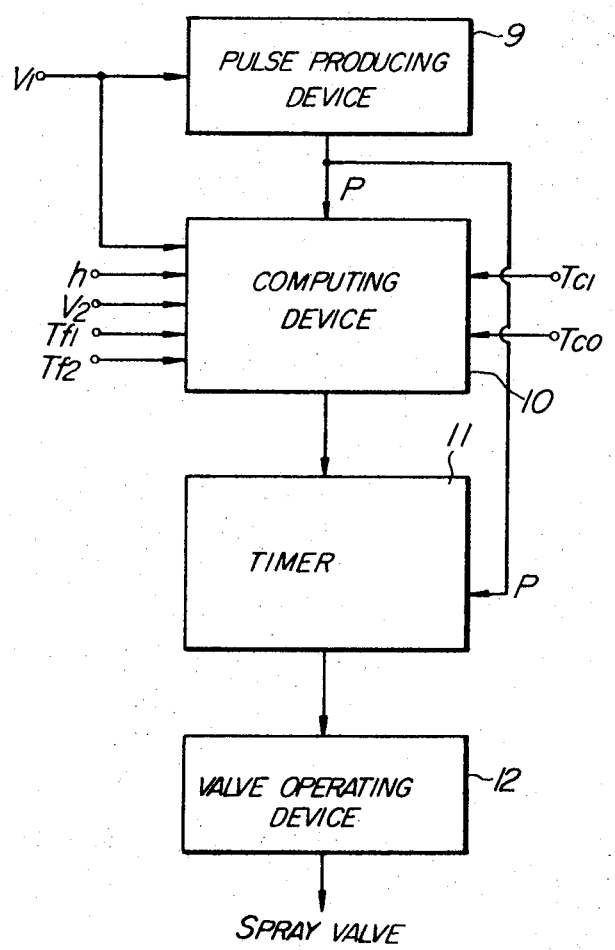

ABSTRACT OF THE DISCLOSURE

Spray valves are sequentially manipulated in the order of from the input side to the output side of a hot strip mill and the succeeding one has a larger cooling power than that of the preceding one. A computing device for computing the on-off time of the spray valves computes the cooling power required for a certain length of a sheet bar ranging from the leading end to a certain point of the sheet bar on the basis of predicted values of various process variables given by a predetermined program. The cooling power required for the remaining length of the sheet bar is computed on the basis of the values obtained by correcting the predicted values by the detected values of the process variables. The individual spray valves are turned on or off depending on the cooling power computed in this manner.

---

This invention relates to an automatic control system for a hot strip mill and the like. More particularly, it relates to improvements in an automatic control system for a hot strip mill in which a plurality of control elements such as spray valves are disposed in spaced relation from each other so that a controlled variable such as the output temperature of a controlled object such as a sheet bar of steel can be maintained at a constant value by these control elements.

In a process control system such as, for example, a system for controlling the output temperature of a sheet bar of metal in a hot strip mill, its control elements are distributed in the space and a few detected values of process variables are only available for the system. With such a control system, an attempt to carry out the desired automatic control by the use of a digital computer results in a complex structure of the computation control system and apparatus, and even if the desired automation might be realized, the accuracy of control may be lower than that attainable with a manual operation.

It is therefore a primary object of the present invention to provide a predictive control system preferably used for the control of the output temperature of a sheet bar of metal in a hot strip mill.

In accordance with the present invention, there is provided a predictive control system for use in a hot strip mill of the kind having a cooling device including a plurality of spray valves for cooling a sheet bar of metal, a first and a second temperature detecting device for detecting the temperature of the sheet bar at the input and output ends of said cooling device, respectively, and a velocity detecting device for detecting the velocity of the sheet bar, said control system comprising a pulse producing device for producing a pulse in response to a signal representing the detected value of velocity delivered from said velocity detecting device at every time when the sheet bar travels a unit distance, a computing device for computing the cooling power required for a certain length of the sheet bar ranging from the leading end to a certain point of the sheet bar on the basis of predicted values of the input temperature and velocity given by a predetermined program, a setting value of the thickness of the sheet bar and a reference value of the output temperature, and at the same time, correcting said predicted values in accordance with said detected values of input and output temperatures and said detected value of velocity and computing the cooling power required for the remaining length of the sheet bar on the basis of the corrected values, a timer including a plurality of counters which are each set with a preset value for instructing the operation of the spray valves required for supplying these cooling powers, said timer generating a direction signal for turning on the designated spray valve when the preset value is reduced to zero as a result of the successive subtraction of unity each time the pulse arrives from said pulse producing device, and a valve operating device for actuating the designated spray valve in response to the direction signal, said spray valves being successively turned on in the order of from the input side to the output side of said mill and so sized that the succeeding one has a larger cooling power than that of the preceding one.

The above and other objects, features and advantages of the present invention will be apparent from the following detailed description of a preferred embodiment thereof taken in conjunction with the accompanying drawings, in which:

FIG. 5 is a block diagram of a preferred embodiment of the present invention.

Figure 1:
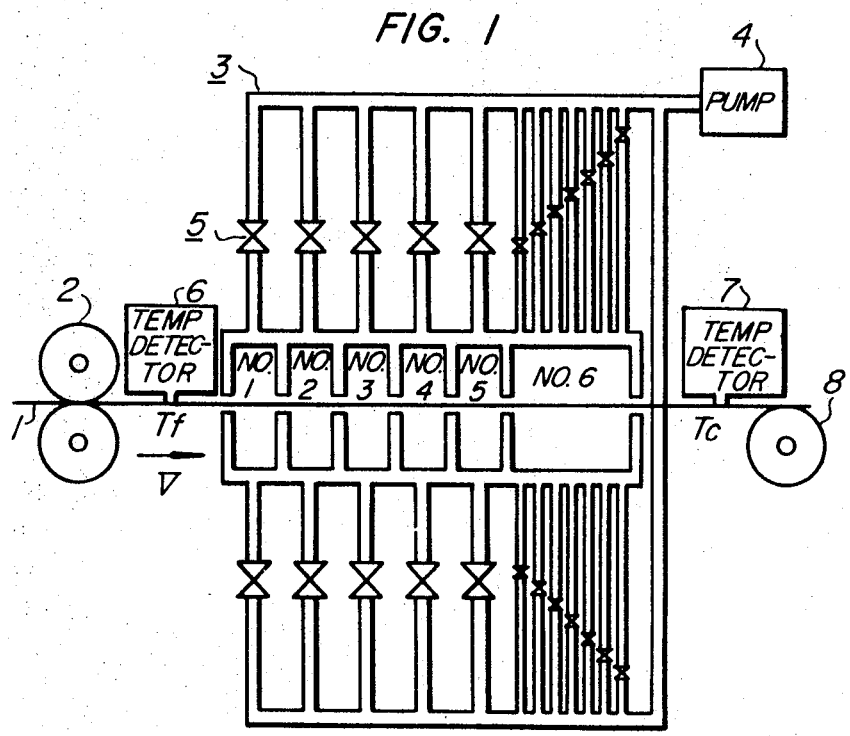
FIG. 1 is a schematic view of a temperature control system in a hot strip mill.

Referring to FIG. 1, a sheet bar 1 of metal is fed past a rolling mill 2 and a cooling device to be finally taken up on a winding device 8. The cooling device includes spray banks 3 of which are supplied with cooling water from a pump 4. Spray valves 5 in the spray banks 3 are suitably opened to direct a spray of cooling water toward the sheet bar 1 to cool the latter. A temperature detector 6 detects the input temperature $T_f$ of the sheet bar 1 at the input end of the cooling device, while a temperature detector 7 detects the output temperature $T_c$ of the sheet bar 1 at the output end of the cooling device.

Now, the factors giving rise to the prior defects previously described will be considered on the temperature control system shown in FIG. 1. The output temperature $T_c$ must be maintained at a constant value in order to obtain a product of uniform quality. According to the conventional control system, a large transient error is involved in the output temperature $T_c$ due to, for example, widely fluctuating delays of the on-off operation of the spray valves, and further an error is inevitably involved in the computed value of the composite cooling power of two or more spray valves because the theory of superimposition does not hold in regard to the cooling power of individual spray valves.

Figure 2A:
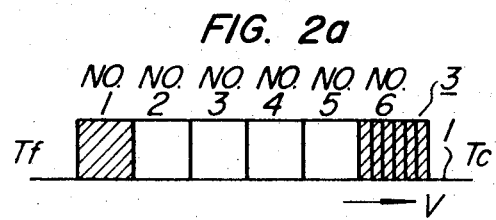
FIGS. 2a, 2b, 4a and 4b are diagrammatic illustrations of the operation of the temperature control system shown in FIG. 1.
Figure 2B:
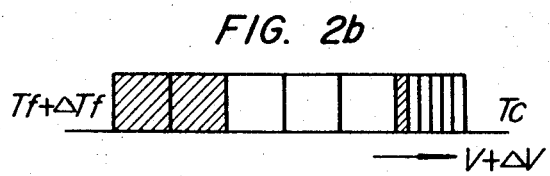

This problem will be discussed in more detail with reference to FIGS. 2a and 2b. In FIGS. 2a and 2b, it is assumed that those spray valves with the hatching are spraying the cooling water. In FIG. 2a, it will be seen that the spray bank No. 6 for the vernier regulation of temperature is in its full working or saturated state and the spray bank No. 1 for the large regulation of temperature is also in operation. Suppose that the velocity V and the input temperature $T_f$ of the sheet bar 1 are increased to $V+\Delta V$ and $T_f+\Delta T_f$, respectively, in the operating state of the cooling device shown in FIG. 2a. Common practice employed in the conventional control system for dealing with such an increase in the velocity and input temperature includes designing to control the spray valves so that the spray bank No. 6 can have a sufficient margin in its temperature regulating ability. Referring to FIG. 2a, the state of the cooling device is such that the spray bank No. 1 for the large regulation of temperature is only in operation except the spray bank No. 6 in which all the spray valves are turned on. According to the common practice, the above state of the cooling device is changed to a state as shown in FIG. 2b in which it will be seen that the spray banks Nos. 1 and 2 are in operation and only one of the spray valves in the spray bank No. 6 is kept turned on while turning off the remaining valves so as to cause the spray bank No. 6 to have a sufficient margin in its temperature regulating ability so that the output temperature $T_c$ can be sufficiently kept at a reference value $T_{co}$ in spite of any further increase of $\Delta V$ and $\Delta T_f$. In other words, the greater part of the cooling power of the spray bank No. 6 is taken over by the cooling power of the spray bank No. 2. However, in the above case, transient errors as shown in FIGS. 3a, 3b and 3c are due to the fact that occasional fluctuations occur in the on-off response of the spray valves and the theory of superimposition does not hold in regard to the cooling power of the spray system controlled by a plurality of valves.

Figure 3A:
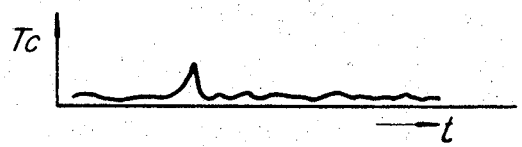
FIGS. 3a, 3b and 3c are graphic illustrations of the temperature control characteristic usually obtained with the temperature control system.
Figure 3B:
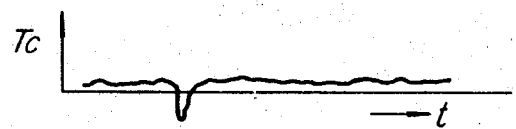
Figure 3C:
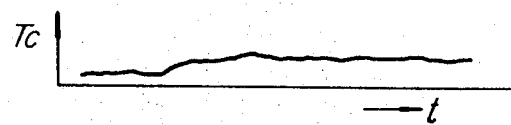

FIG. 3a shows a variation in the output temperature $T_c$ relative to time $t$ when the spray bank No. 2 is turned on in delayed relation from the time of turning off the spray valves in the spray bank No. 6 and FIG. 3b shows a similar relation when the spray bank No. 6 is turned off in delayed relation from the time of turning on the spray bank No. 2, while FIG. 3c shows a similar relation when a quantitative error occurs during taking over the cooling power of the spray bank No. 6 by the cooling power of the spray bank No. 2. Actually, the temperature variations shown in FIGS. 3a and 3c and those shown in FIGS. 3b and 3c can take place simultaneously.

Figure 4A:
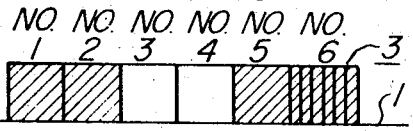
Figure 4B:

Referring to FIG. 4a, the spray banks Nos. 2 and 6 as well as the spray banks Nos. 1 and 5 preceding the spray banks Nos. 2 and 6 are placed in operation. Now, let us evaluate the cooling power of the cooling device when the state of the cooling device shown in FIG. 4a is changed to a state as shown in FIG. 4b in which the spray banks Nos. 1 and 5 are turned off. It is apparent that the cooling power of the spray banks Nos. 2 and 6 in the state of FIG. 4a is less than that in the state of FIG. 4b. This is because, in the case of FIG. 4b, a portion of the cooling water sprayed from the spray banks Nos. 2 and 6 flows toward the sheet bar portions passing through the ranges of the spray banks Nos. 1 and 5, whereas in the case of FIG. 4a, such a phenomenon does not occur since the cooling power of the spray banks Nos. 1 and 5, is saturated and thus the cooling effect due to the water flowing from the banks Nos. 2 and 6 can be neglected.

Therefore, even if the cooling power of the spray banks Nos. 2 and 6 can be accurately evaluated in the state of the cooling device shown in FIG. 4a, this does not apply to the state of the cooling device shown in FIG. 4b and an evaluation error results. The same applies to the reverse case. To deal with such an evaluation error, a method may be taken in which the cooling power of the spray banks Nos. 2 and 6 in the on-state of the spray banks Nos. 1 and 5 is evaluated separately from the cooling power of the spray banks Nos. 2 and 6 in the off-state of the spray banks Nos. 1 and 5. However, the practice of such an evaluation for every case results in a large increase in the memory capacity of the automatic control device as well as in a complex program due to a complex combination of the on-off control of the spray valves. Further, it is difficult to experimentally confirm the effect of such a complex method for the evaluation of the cooling power and it is hard to expect the practical effect of the method above described even if this method is found to be practicable.

In addition to the problems described above, the prior art system involves the following problems:

(1) The spray valves must be prematurely manipulated in view of the delay in the on-off operation of the spray valves. However, computation of the manipulated variable for the premature manipulation tends to give rise to many errors.

(2) The large-capacity spray valves having a large cooling power must be turned on with accurate timing for the temperature control of the sheet bar after the trailing end of the sheet bar has moved out of the rolling mill because the velocity and temperature of the sheet bar at the outlet of the rolling mill are increased to an especially high value. However, the large-capacity spray valves are quite slow in their response and thus the manipulation of the spray valves by the direct detection of the leaving of the trailing end of the sheet bar off the rolling mill is too late to prevent a large transient error from appearing in the output temperature.

(3) The switch-over between the large-capacity spray valves in the spray banks Nos. 1 through 5 and the vernier regulation spray valves in the spray bank No. 6 must be suitably carried out so that the cooling power of the latter can be taken over by the cooling power of the former, resulting in having to turn the on-off spray valves quite frequently. This is objectionable as it reduces the service life of the spray valves and results in a high maintenance cost.

An embodiment of the present invention which overcomes the prior problems above referred to will be described in detail with reference to FIG. 5.

Referring to FIG. 5, an automatic control system according to the present invention comprises a device 9 for producing pulses by detecting the distance advanced by the sheet bar 1, a computing device 10, a timer 11 and a valve operating device 12. Means such as, for example, a tachometer (not shown) detects the number of revolutions of the rolls 2 to seek the velocity $V_1$ with which the sheet bar 1 is being taken up and a signal representative of the detected velocity $V_1$ is applied to both the pulse producing device 9 and the computing device 10. Detected values $T_{f1}$ and $T_{c1}$ of the input and output temperatures $T_f$ and $T_c$ are also supplied to the computing device 10. In addition to the detected values described above, predicted values $V_2$ and $T_{f2}$ of the velocity $V$ and temperature $T_f$ given by a predetermined program, a setting value $h$ of the thickness of the sheet bar, and a reference value $T_{co}$ of the output temperature, $T_c$ are also supplied to the computing device 10.

In the present embodiment, the spray valves are turned on successively in the order of from the one nearest to the rolling mill to the one nearest to the winding device and are turned off successively in the reverse over or in the order of from the one nearest to the winding device to the one nearest to the rolling mill, and any one of them is not skipped unless it is faulty. The cooling power of the spray valves is determined according to the following equation:

$$\alpha_q = \frac{K_e' + \sum_{i,j=1}^{q,n(i)} K_{ij}}{K_e' + \sum_{i,j=1}^{m,n(i)} K_{ij}} \quad (1)$$

where $K_e'$ is the cooling power developed by radiation in the section between the temperature detectors 6 and 7 which cooling power is expressed in terms of the cooling power of the spray, $K_{ij}$ is the cooling power developed by a valve No. $j$ in a spray bank No. $i$ when such a valve is turned on, $m$ is the maximum value of the number of the spray banks, $n(i)$ is the maximum value of the number of the spray valves in the spray bank No. $i$, $q$ is the bank number the cooling power of which is being sought, and $\alpha_q$ is the ratio of the cooling power of the spray bank No. $q$ to the cooling power of the spray bank No. 1.

It is possible to decrease the variation of the output temperature relative to the variation of the detected values thereby to minimize the error or the total number of the spray valves by determining the cooling power on the basis of the above Equation 1. Thus, the following relation holds between $T_f$ and $T_{c2}$ when the spray valves are turned on and off in the order described above.

$$T_{c2} = T_f \exp\left\{-\left(\frac{K_e' + \sum_{i,j=1}^{q-1,n(i)} K_{ij} + \sum_{j=1}^{l} K_{qj}}{h \cdot V}\right)\right\} \quad (2)$$

where $q$ is the spray bank number showing the fact that a spray valve in the spray bank No. $q$ is turned on while no valves in the spray bank No. $(q+1)$ are turned on, and $l$ is the valve number counted from the mill side showing the fact that a spray valve No. $l$ in the spray bank No. $q$ is turned on while the spray valve No. $(l+1)$ is not present or is turned off.

The following equation holds when all the spray valves are turned on and the velocity $V$ is changed to $V'$:

$$T_{c2} = T_f \exp\left\{-\left(\frac{K_e' + \sum_{i,j=1}^{m,n(i)} K_{ij}}{h \cdot V'}\right)\right\} \quad (3)$$

Changes of the output temperature $T_{c2}$ relative to the variation of the total cooling power of the spray banks may be sought from the Equations 2 and 3 and are given by:

$$\Delta T_{c2} = -\frac{T_{c2}}{hV} \cdot \Delta K \quad (4)$$

$$\Delta T_{c2}' = -\frac{T_{c2}}{hV'} \cdot \Delta K' \quad (5)$$

where $\Delta T_{c2}$ and $\Delta T_{c2}'$ are changes of the output temperature $T_{c2}$, and $\Delta K$ and $\Delta K'$ are changes of the total cooling power of the spray banks. Suppose that $\Delta T_{c2}$ given by the Equation 4 is equal to $\Delta T_{c2}'$ given by the Equation 5, then $$-\frac{T_{c2}}{hV} \cdot \Delta K = -\frac{T_{c2}}{hV'} \cdot \Delta K'$$

and the following equation can be obtained:

$$\frac{\Delta K}{\Delta K'} = \frac{V}{V'} \quad (6)$$

$V/V'$ sought from the Equations 2 and 3 is substituted for $V/V'$ in the Equation 6 to obtain the following equation:

$$\frac{\Delta K}{\Delta K'} = \frac{K_e' + \sum_{i,j=1}^{q-1,n(i)} K_{ij} + \sum_{j=1}^{l} K_{qj}}{K_e' + \sum_{i,j=1}^{m,n(i)} K_{ij}} \quad (7)$$

As will be apparent from the comparison between the right-hand members of the Equations 1 and 7, these members are fairly analogous to each other. A result similar to the above is obtained when $h$ in the Equation 3 is changed in lieu of $V$. Thus, the Equation 7 specifies the condition for attaining the relation $\Delta T_{c2} = \Delta T_{c2}'$ relative to a change of $V$. Apparently, $T_{c2}$ makes a substantially equal change when the cooling power of the spray banks is determined on the basis of the Equation 1 provided that $T_f$ and $T_{co}$ are kept constant. In this manner, the total number of the spray valves can be reduced to a minimum under the condition that the quantization error due to the repeated on-off operation of the spray valves is kept constant, or the quantization error can be reduced to a minimum under the condition that the total number of the spray valves is fixed.

Figure 6:
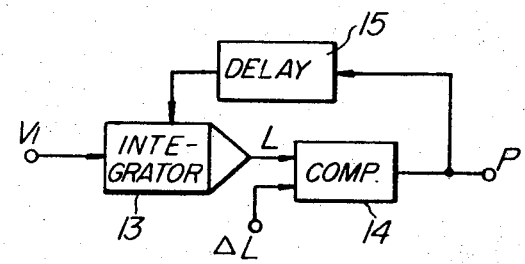
FIG. 6 is a circuit diagram of the pulse producing device in the system shown in FIG. 5.

The spray valves arranged to satisfy the above condition are controlled in a manner as described below. The pulse producing device 9 responsive to a signal representative of the detected velocity $V_1$ of the sheet bar 1 integrates the detected voltage which is proportional to the detected velocity $V_1$, and applies a pulse to the computing device 10 and timer 11 each time the result of integration attains a value equivalent to a unit length $\Delta L$ of the sheet bar. The principal parts of the pulse producing device 9 are shown in FIG. 6. As will be seen from FIG. 6, the pulse producing device 9 includes an integrator 13, a comparator 14 and a delaying element 15. The integrator 13 integrates the detected voltage. The comparator 14 compares the integrated value $L$ with the value $\Delta L$ representing the unit length of the sheet bar. When the integrated value $L$ exceeds the value $\Delta L$, an output appears from the comparator 14 on its output lead and this output is fed back to the integrator 13 through the delaying element 15 to reset the integrator 13 after a predetermined period of time. Thus, a pulse P can be derived from the pulse producing device 9 as the sheet bar travels the unit distance.

In the computing device 10, all the computation required for the control is not carried out solely on the basis of the values actually detected on the sheet bar. With respect to a certain length of the sheet bar ranging from the leading end to a certain point thereof, computation is carried out on the basis of predicted values given by a predetermined program until the leading end of the sheet bar reaches the input end of the spray bank No. 1. This kind of computation is termed preset computation herein. With respect to the remaining portion of the sheet bar, computation is carried out each time the pulse producing device 9 delivers a pulse after the leading end of the sheet bar has reached the input end of the spray bank No. 1. This kind of computation is termed control computation herein. In order to facilitate these two kinds of computation, it is so arranged that each of the spray banks covers a distance $\Delta L$ and the spray banks Nos. 3 and 4 as well as the spray bank No. 6 and the temperature detector 7 are spaced by $\Delta L$'s. These distances are termed table unit distances herein and are numbered $N_t$ in the order of from the input to the output side. Similarly, the sheet bar is divided into sections starting from its leading end so that each section covers a distance $\Delta L$. These distances are termed strip unit distances herein and are numbered $N_s$ in the order of from the leading end to the trailing end of the sheet bar. Generation of pulses by the pulse producing device 9 is started as soon as the entrance of the sheet bar into the spray bank No. 1 is detected by the temperature detector 6 or any other suitable means. A pulse is generated each time the sheet bar is advanced by $\Delta L$ and the number of counts is $N$.

The maximum value $N_{sp}$ of the number of the strip unit distances of the sheet bar for which the preset computation is to be carried out is determined from the following formula so as not to give rise to the delay of the valve control to regard a delay in the on-off operation of the spray valves:

$$N_{sp} = \text{Max}\left\{I\left(\frac{T_d(N_t, Q, S) \cdot \overline{V(N_s, N_t)}}{\Delta L}\right) + 1 - N_t\right\} + 1 \quad (8)$$

where Max means that the maximum value of the integer in { } is taken, $T_d(N_t,Q,S)$ represents the delay time of a specific spray valve and is a function of a table unit distance No. $N_t$, a valve No. $Q$ under consideration and a symbol $S$ indicating that the specific valve is either on or off, and $\overline{V(N_s,N_t)}$ represents the predicted value of the velocity with which each strip unit distance passes over each table unit distance. $\overline{V(N_s,N_t)}$ has the following relation with the predicted value $V_2(N)$ of the velocity of the sheet bar with which it is taken up:

$$\overline{V(N_s, N_t)} = V_2(N) \qquad (9)$$

$$N = N_s + N_t - 1 \qquad (10)$$

The symbol I in the Equation 8 indicates the fact that a decimal fraction of $$\left( \frac{T_d(N_t, Q, S) \cdot V(N_s, N_t)}{\Delta L} \right)$$

is reckoned as a unit so that it represents an integer. Thus, $$I \left( \frac{T_d(N_t, Q, S) \cdot V(N_s, N_t)}{\Delta L} \right)$$

represents as a whole the maximum value of the number of the table unit distances over which the sheet bar travels during a period of time corresponding to the delay time in the on-off operation of the spray valve.

In this manner, the preset computation is carried out on the portion of the sheet bar, which ranges a length of $N_{sp} \cdot \Delta L$ from the leading end thereof, on the basis of the predicted values described above so as to determine the spray valves to be turned on or off.

The control computation is started when the first strip unit distance of the sheet bar reaches a point which is spaced a distance of $N_{sp} \cdot \Delta L$ from the spray valve No. 1 in the spray bank No. 1. The predicted value of temperature is corrected by the detected value according to the following formula to determine the spray valves which should be controlled to coincide the output temperature $T_c$ with a reference value $T_{co}(N_s)$:

$$T(N_s, N_t) = T(N_s, N_t - 1)$$
$$- \frac{1}{h} \left( \sum_{J=1}^{L(N_s, N_t)} K(N_t, J) + K'(T + 273)^4 \right)$$
$$\cdot \frac{\Delta L}{V(N_s, N_t) + \Delta V(N_s, N_t)} \qquad (11)$$

where $N_s = 1, 2, \ldots, N_{sm}$, and $N_t = 1, 2, \ldots, N_{tm}$. $T(N_s, O) = T_{f2}(N_s) + \Delta T_f(N_s)$ where $\Delta T_f(N_s)$ is the value for correcting the predicted value $T_{f1}(N_s)$ on the basis of the detected value $T_{f2}(N_s)$. Thus, $$\Delta T_f(N_s) = T_{f2}(N_s) - T_{f1}(N_s) \qquad (12)$$

$$N_s = N + N_{sp} \qquad (13)$$

No correction is carried out when $N_s \leq N_{sp}$ because this belongs to the scope of the preset computation.

Similarly, $\Delta V(N_s, N_t)$ is the value for correcting the predicted value $V_2(N)$ on the basis of the detected value $V_1(N)$. Thus, $$\Delta V(N_s, N) = V(N)_2 - V_1(N) \qquad (14)$$

$$N_s = N + N_{sp} \qquad (15)$$

No correction is carried out when $N_s \leq N_{sp}$ because this belongs to the scope of the preset computation.

In the Equation 11, $T(N_s, N_t)$ represents the temperature of a strip unit distance No. $N_s$ at the output side end of a table unit distance No. $N_t$, and $T_{co}(N_s) \approx T(N_s, N_{tm})$. $K(N_t, J)$ represents the cooling power developed by a spray valve No. $J$ in the table unit distance No. $N_t$ when such a valve is turned on. $N_{sm}$ and $N_{tm}$ represent the maximum values of $N_s$ and $N_t$, respectively. $L(N_s, N_t)$ represents the valve number such that a valve No. $L(N_s, N_t)$ in the table unit distance No. $N_t$ is turned on and a valve No. $L\{(N_s, N_t) + 1\}$ is not present or is turned off. The predetermined valves to be turned on and off can be sought by repeatedly computing $L(N_s, N_t)$ from the Equation 11. In this case, $L(N_s - 1, N_t)$ may be employed as the initial value of $L(N_s, N_t)$ so as to reduce the number of repetition of the computation.

The timer 11 is set at the following value of $N_m$:

$$N_m = N + L(N_s, N_t) - 1 + I \left( \frac{T_d(S, Q, N_t) \cdot V(N_s, N_t)}{\Delta L} \right) \qquad (16)$$

where I indicates the fact that a decimal fraction of $$\left( \frac{T_d(S, Q, N_t) \cdot V(N_s, N_t)}{\Delta L} \right)$$

is reckoned as a unit so that it represents an integer. The timer 11 may, for example, be composed of a plurality of counters issuing instructions to individual spray valves and $N_m$ is set in the counters. When the content of the counter is reduced to zero as "1" is successively subtracted from $N_m$ each time a pulse is fed from the pulse producing device 9, a direction signal for a corresponding valve is supplied to the valve operating device 12 to turn on the desired spray valve.

As will be apparent from the foregoing description, the present invention provides many advantages as enumerated below.

(1) The spray valves are turned on in the sequential order from the input to the output side. It is therefore possible to eliminate an undesirably large transient error involved in the output termperature due to widely fluctuating responses of the spray valves. The cooling power of a spray valve when such a spray valve is turned on from its turned-off position can be defined as an increment of the cooling power of the whole spray system itself. Thus, the cooling power of the spray system increases linearly as the spray valves are successively turned on, and this simplifies the computation system. The required control can be effected with a reduced frequency of on-off operation of the spray valves, thereby extending the service life of the spray valves, reducing maintenance costs and simplifying the computation system.

(2) The cooling power of the spray system is steadily increased as the spray valves are successively turned on. The quantization error at the maximum is therefore less than that in the prior art system provided that the total number of spray valves is the same, and the total number of the spray valves is less than that in the prior art system provided that the maximum quantization error is identical.

(3) The spray valves are turned on in the order of from the one nearest to the rolling mill to the one nearest to the winding device. In this arrangement, the spray valves having a larger on-off delay are disposed nearer to the winding device and their on-off delay can be compensated that much. Thus, the predetective computation for the on-off of the spray valves can be carried out on the basis of the detected values at substantially the real time, and the accuracy of the computation can be improved correspondingly.

(4) The unit distances travelled by the sheet bar are counted to detect the time elapsed during the travel of the sheet bar, and this is utilized for the computation of the required cooling power. Thus, the advanced position of the sheet bar relative to time can be accurately known and the output temperature $T_c$ can be accurately predicted. It is therefore possible to attain a highly accurate predictive control taking into account the delay in the on-off operation of the spray valves, and especially a remarkably high accuracy can be attained in control after the trailing end of the sheet bar has left the rolling mill.

In addition to the control of the output temperature in the hot strip mill described above, the predictive control system according to the present invention is widely applicable to control systems including a system for controlling the chemical reaction in a pipeline in which a plurality of control elements are distributed in the space. Further, the present invention is applicable not only to the feed forward control but also to a modification of the feed forward control in which the error between a controlled variable and its reference value is detected to correct a numerical model or to effect a feedback control for further enhancing the accuracy of control.

In the present invention, the computing device 10 carries out the preset computation and control computation for computing the required cooling power. In an automatic control system employing a plurality of control elements distributed in the space as described above, the manipulated variable K(t) is represented in the form of a complex function including a plurality of functions of time. In the case of a hot strip mill, for example, the manipulated variable K(t) is expressed as $$K(t) = \Phi\{T_f(t), h, V(t), T_c(t), T_{co}\}$$

While it has been difficult to realize a system which is easily capable of computing such a manipulated variable, this can be easily attained by the present invention in which the two kinds of computation, that is, the preset computation and control computation are separately carried out. More precisely, the preset computation is used to compute a manipulated variable which is not a function of time and is preset relatively roughly and the control computation is used to compute a manipulated variable which is a function of time and is simulated in an analog fashion. Two devices for separately computing these two manipulated variables may be provided so that the manipulated variable which is not the function of time is utilized to manipulate the majority of the control elements or spray banks Nos. 1 to 5 which are relatively spaced apart from the position at which the controlled variable or output temperature $T_c(t)$ is detected, and the manipulated variable which is the function of time is utilized to manipulate the control element or spray bank No. 6 disposed adjacent to the position at which the controlled variable is detected.

What is claimed is:

1. In a hot strip mill having a cooling device including a plurality of spray valves for cooling a sheet bar of metal, a first and a second temperature detecting device for detecting the temperature of the sheet bar at the input and output ends of said cooling device, respectively, and a velocity detecting device for detecting the velocity of the sheet bar, an automatic control system comprising a pulse producing device for producing a pulse in response to a signal representing the detected value of velocity delivered from said velocity detecting device at every time the sheet bar travels a unit distance, a computing device for computing the cooling power required for a certain length of the sheet bar ranging from the leading end to a certain point of the sheet bar on the basis of predicted values of the input temperature and a given velocity provided by a predetermined program, a setting value of the thickness of the sheet bar and a reference value of the output temperature, and at the same time, correcting said predicted values in accordance with said detected values of the input and output temperatures and said detected value of velocity and computing the cooling power required for the remaining length of the sheet bar on the basis of the corrected values, a timer including a plurality of counters which are each set with a preset value for instructing the operation of the spray valves required for supplying these cooling powers, said timer generating a direction signal for turning on the designated spray valve when the preset value is reduced to zero as a result of the successive subtraction of unity each time the pulse arrives from said pulse producing device, and a valve operating device for actuating the designated spray valve in response to the direction signal, said spray valves being successively turned on in the order of from the input side to the output side of said mill and so sized that the succeeding one has a larger cooling power than that of the preceding one.

References Cited
UNITED STATES PATENTS 3,514,984    6/1970    Cook _____ 72—7
2,851,042    9/1958    Spence _____ 266—6 (–S) X MILTON S. MEHR, Primary Examiner U.S. Cl. X.R.

72—13, 201; 266—6